United States Patent [19]

Beesley et al.

[11] Patent Number: 4,577,383

[45] Date of Patent: Mar. 25, 1986

[54] WELDING JIG

[76] Inventors: Robert S. Beesley, P.O. Box 152, Cleveland, Utah 84518; Joe Feichko, 432 E. Sunset Rd., Henderson, Nev. 89015

[21] Appl. No.: 606,934

[22] Filed: Sep. 4, 1984

[51] Int. Cl.⁴ ............................................. B25B 27/14
[52] U.S. Cl. ................................................... 29/281.1
[58] Field of Search ...................... 269/37, 38, 45, 47; 29/281.1, 281.4, 281.5, 281.6; 228/49 R

[56] References Cited

U.S. PATENT DOCUMENTS 2,105,954  1/1938  Rippe ................................... 29/272
2,836,208  5/1958  Hoyt .................................... 269/45
3,727,283  4/1973  Wognum ........................... 29/281.1
3,805,355  4/1974  Gornik ................................ 269/38

Primary Examiner—Robert C. Watson

[57] ABSTRACT

A welding jig for in situ use on drum shaped cutter heads. The jig includes a pair of mirror image assemblies each of which is attachable to the mining machine at one end of the cutter to provide a pivot point that lies on the cutter axis. A lever extends radially from the pivot to terminate above the cutter, a rigid bar extends between the levers and over the cutter surface, and bit locaters are provided to be received on the rigid bar.

5 Claims, 11 Drawing Figures

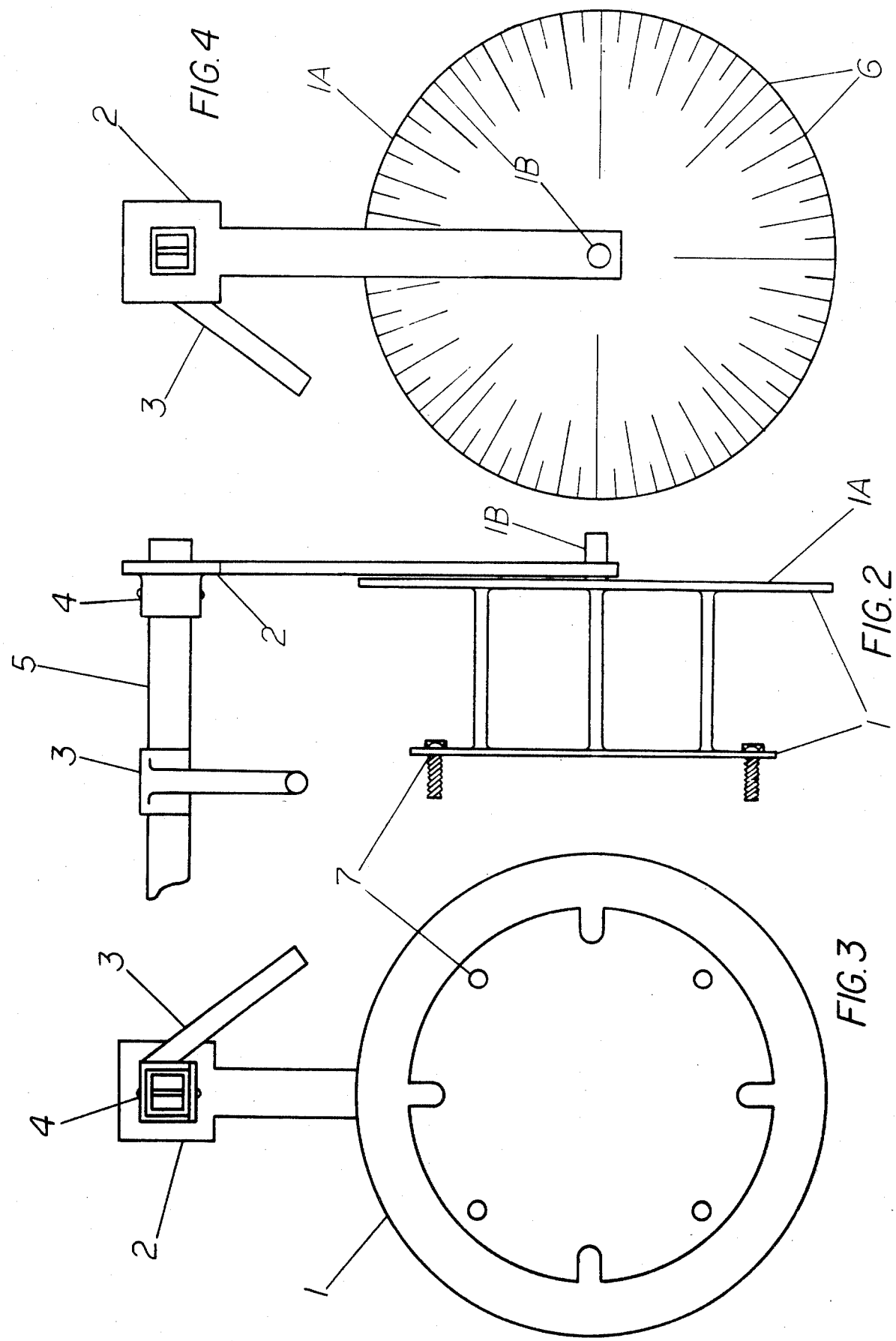

WELDING JIG

The welding jig described below, can be mounted on any continuous mining machine, that has rotating drums.

This welding jig will locate the bit blocks, to lace and replace them.

The main objective is to maintain an exceptionally high tolerance in the bit diameter, bit angle, skew, lean and all angles involved in the cutting edges of the bit. All diameters would be maintained throughout the head to within 1/32 of an inch (0.032). By insuring even thrust and attack angles across the head, cutting maintenance would be improved, vibration would decrease, all bits cutting on the same diameter would equalize thrust pressure on the heads and bearings to improve bearing life, gears etc.

Of primary concern, is the ease of which the jig may be used in or out of the mines for the replacement of the bit blocks.

In order that the invention may be better understood and carried into effect reference is made to the accompanying drawings and description which are offerred by way of example only and not in limitation of the invention the scope of which is defined by the appended claims.

FIG. 2 is a side view of the device illustrated in FIG. 1.

FIG. 3 is an orthographic projection of FIG. 2.

FIG. 4 is another orthographic projection of FIG. 2 showing the angular graduations in the outer plate.

FIG. 5 is a top view of a bit block holder or locater for use on the jig.

FIG. 6 is a face-on view of another locater.

FIG. 7 is a top view of another locater.

FIG. 8 is a side elevational view of another locater.

FIG. 9 is a face-on view of still another locater.

FIG. 10 is a face-on view of another locater; and

FIG. 11 is a side view of a locater.

Figure 1:
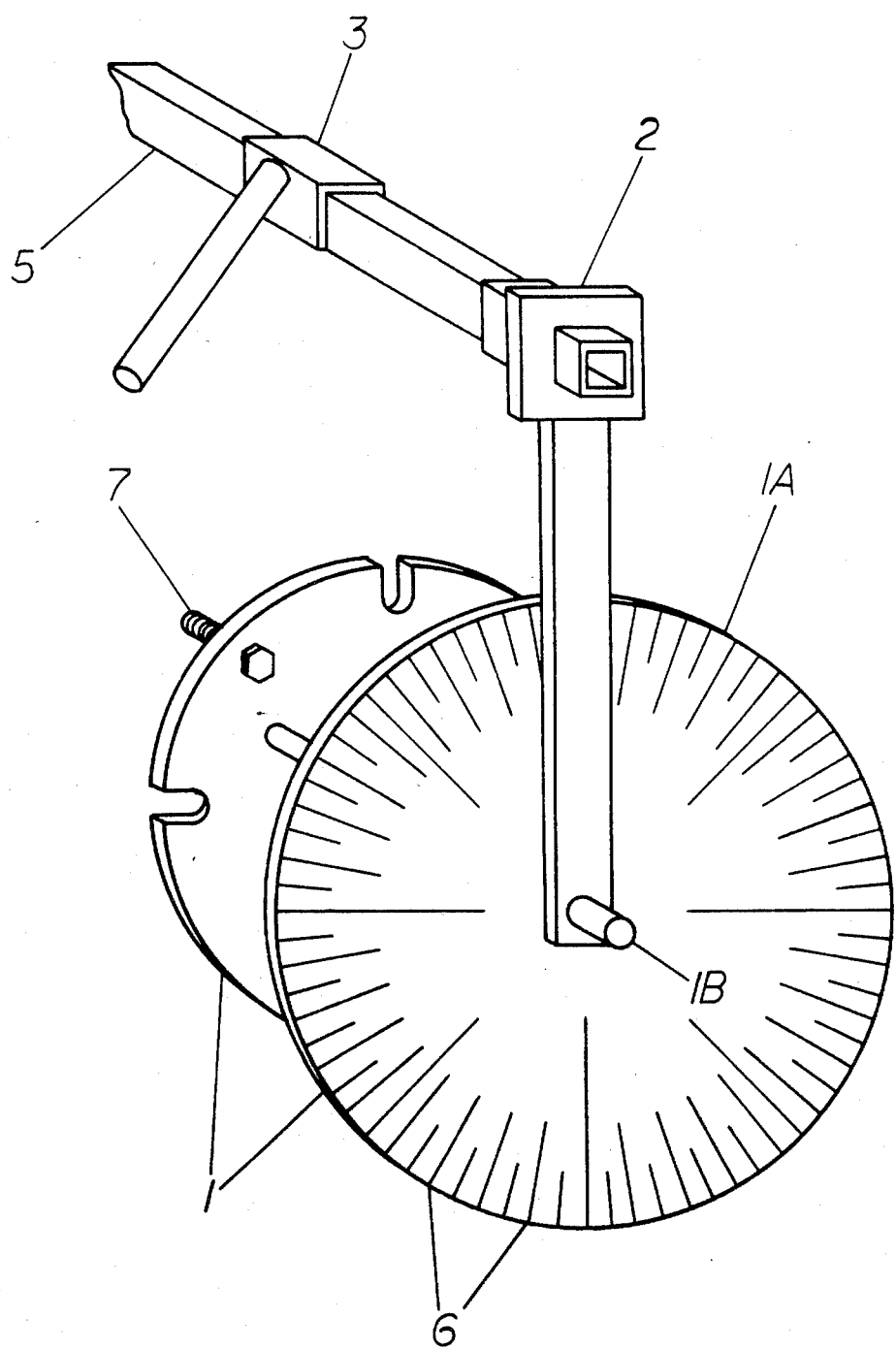
FIG. 1 is a perspective view showing one end of the welding jig.
Figure 5:
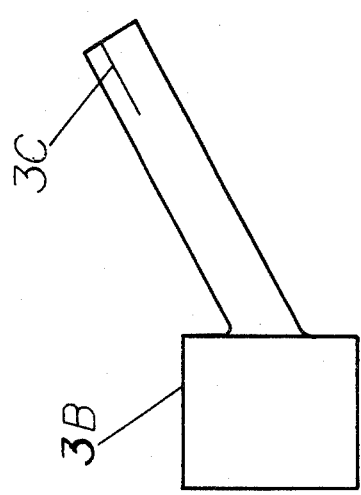
FIGS. 5-11 are views of several locaters useful in the jig. They fit on and slide along the rigid bar.
Figure 6:
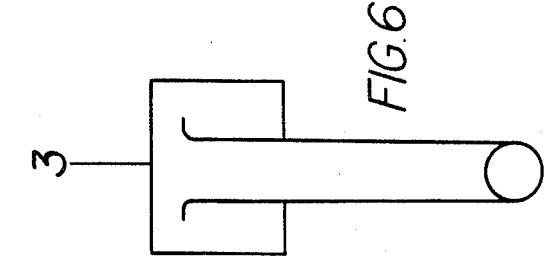
Figure 7:
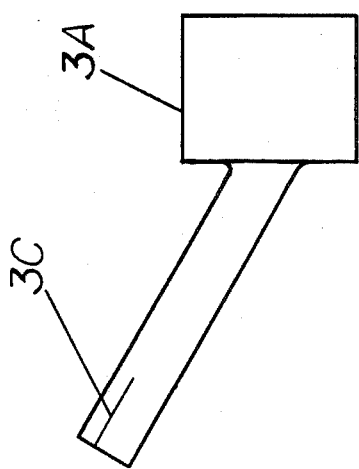
Figure 8:
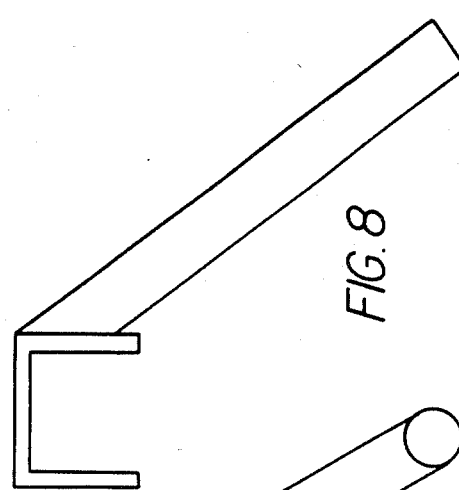
Figure 9:
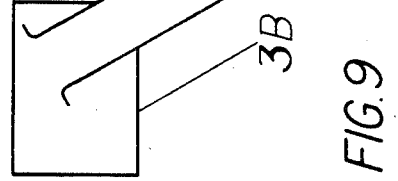
Figure 10:
Figure 11:
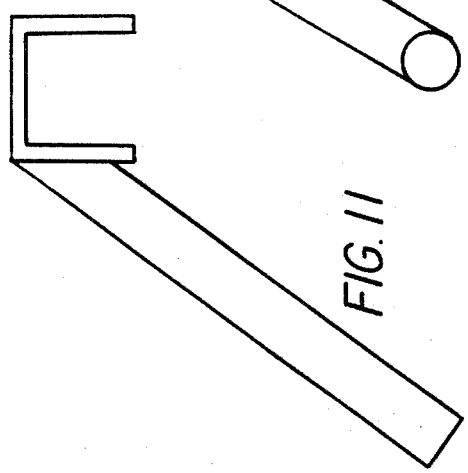

The invention is described in connectin with the accompanying drawings. However, for a clearer appreciation of the invention one should keep in mind that the drawings show only one end of the welding jig of the invention. The complete jig comprises two assemblies that are mirror images. Each includes a base plate that is secured to one end of a tubular or drum shaped cutter head while the head is still in place on a mining machine. The two assemblies are functionally secured together by a rigid tubular bar or tube 5 along which a bit block holder or locater may be moved to a desired location. The bar ends are secured to levers that rotate about the axis of the drum at its opposite ends.

The locator or bit block holder 3 includes a rod that approximates the diameter of a cutter bit that is to be actually held in the block for use. This rod is made so that it is, in effect, an extension of the actual cutter bit that will be later inserted. Thus, a bit block that is held on the rod while the block is welded in place will be properly located so that a bit later inserted into the bore in the block will be precisely located on the cutter head to satisfy all specifications. Thus, the welding jig, used with proper block holders or locaters will enable complete compliance with all requirements of the lacing specifications.

The welding jig consists of two base plates (1), which are mounted on each end of the miner head. The welding jig in the drawings would mount on any head with 8 holes (7), equally spaced, on a 15" diameter inspection cover. On other miner heads, mounting bolt diameters (7) would depend on whether or not inspection covers are present or the exposed end of the shaft is visible. Then the base plate (1) would mount to it.

The outer side of the base plate (1A), after mounting has a concentric shaft (1B) and is divided into degrees (6) so when a complete relacing job is to be done, the lacing print specifications (spacing, lean, skew, bit angle and bit diameter) can be maintained at a very high tolerance.

The concentricity of the diameter is maintained by insuring that the base plate (1) is concentric to the drum diameter of the miner head. The jig diameter is maintained by using a diameter locater (2) which rotates around the concentric shaft (1B) of the base plate (1).

A 2"×2" piece of tube steel (5) would attach to the diameter locater (2) by a tube sleeve with a locking pin (4) connection. This would maintain the diameter and provide a tooling location for the bit locater (3).

The bit locater (3) would slide from side to side, the full width of the head, and would be built to a close enough tolerance to maintain the angle of the bit blocks. Diameter could be maintained by using feeler gauges to measure bit block height or to shim the blocks for welding.

The bit locater (3) maintains the bit angle by having a solid bar the size of a bit (1 inch). This locater, when mounted on the jig, maintains diameter and angle, by providing a positive tooling location. By insuring that the locater is completely down on the cross bar (5) and that the bit block is against the locater bar end, all bit block diameters will be the same. Two other locaters (3A and 3B) designed for bit that lean and have a skew, would also provide a positive location. The lean would be maintained by a bar having the proper angles to locate the bit at the lean. The skew would be maintained, by aligning the center of the bit block parallel to the skew line (3C) scribed on the locater bar according to the lacing prints.

By giving a positive location to all lacing print specifications, this jig has many benefits compared to conventional underground bit replacements.

To use this jig, first rotate miner head so that the bit being replaced is in the upright position. Then remove the four bolts on the side of the miner head. You would then mount a base plate on each end of the miner head.

On a bit block replacement job, it wouldn't matter which direction the degree scale (6) on the outer base plate (1A) is facing. On a relacing job (replacement of all bits), to facilitate ease in bit spacing, degrees should align with print degrees.

After mounting base plates (1), diameter locaters (2) would slide over shafts (1B) on the base plates (1). Then the 2"×2" tube steel (5) will slip into the diameter locater sleeves (4) and then be held in place by a pin (4).

Next place a new bit block onto the bit locater (3) and slide it to desired location on the diameter bar (5) (2"×2" tube steel), then rotate diameter locater (2) around the circumference so the bit is at the bit block base position. Next weld the bit block into place.

The person using the jig will need to insure that all tolerances are maintained.

We claim:

1. A welding jig for locating bored bit tool blocks on the surface of a rotatable cutting head of a mining machine, said jig comprising a pair of assemblies each of which assemblies includes means for securing the same to one end of said rotatable drum head and having a lever rotatable about the axis of said drum said lever extending beyond the surface of said drum; a rigid bar secured to and extending between said levers parallel to the axis of said drum and at a location above the surface of said drum, at least one bit block holder adapted to hold bit blocks which are bored to accept cutting bits, means for mounting said bit block holder on said rigid bar to be non-rotational but slideable thereon, and means on said bit block holder for receiving and guiding bit blocks toward the surface of said drum.

2. A welding jig according to preceding claim 1 in which each of said assemblies includes a base plate, means for securing said base plate to one end of said drum transverse to the axis thereof, a stub shaft extends from said base plate axially of the axis of said drum, and one of said levers rotates about said stub shaft.

3. A welding jig according to preceding claim 2 with angular markings on said base plate for angularly locating said lever and bit block holder on the surface of said drum.

4. A welding jig according to preceding claim 1 in which said rigid bar extending between said levers is a rectangular tube and said means mounting said bit block holder for non-rotational sliding movement thereon comprises a channel on said bit block holder that snugly receives said tube.

5. A welding jig according to preceding claim 1 in which said means on said bit block holder to hold a bit block comprises a rod of approximately the cross-section of the bit to be held by said bit block and said rod is angled toward the surface of said drum in the path of an extension of a properly located cutting bit, whereby a bit block received on said rod may be guided toward said drum surface concommitantly with movement therealong.

* * * * *